Feb. 19, 1929.

W. L. THAETE 1,702,580

CUT-OFF ATTACHMENT FOR FAUCETS

Filed Nov. 30, 1925   2 Sheets-Sheet 1

INVENTOR.
William L. Thaete
BY
ATTORNEY.

Feb. 19, 1929.                                                    1,702,580
W. L. THAETE
CUT-OFF ATTACHMENT FOR FAUCETS
Filed Nov. 30, 1925          2 Sheets-Sheet 2

INVENTOR.
William L. Thaete
BY
ATTORNEY.

Patented Feb. 19, 1929.

1,702,580

UNITED STATES PATENT OFFICE.

WILLIAM L. THAETE, OF DENVER, COLORADO, ASSIGNOR TO THAETE AUTOMATIC VALVE CORPORATION, OF DENVER, COLORADO, A CORPORATION OF COLORADO.

CUT-OFF ATTACHMENT FOR FAUCETS.

Application filed November 30, 1925. Serial No. 72,319.

My invention relates to cut-off attachments for faucets and its primary object is to provide a device of very simple construction which by only a slight alteration in the construction of a faucet of standard make, may be inserted into the housing thereof to provide a valve which will automatically shut off the flow of water, when for the purpose of repair, the faucet valve is removed.

A further object of the invention is to provide by means of the aforementioned attachment an efficient seat for the valve of the faucet, which replaces that of the original construction.

Figure 1:
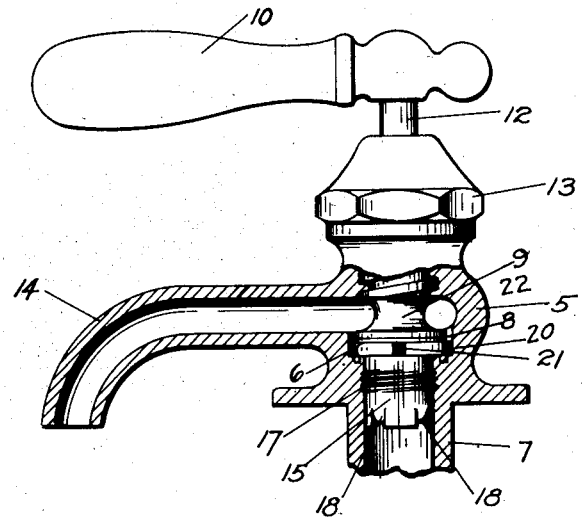
Figure 2:
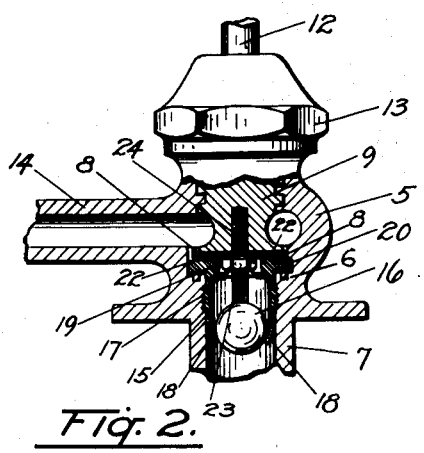
Figure 3:
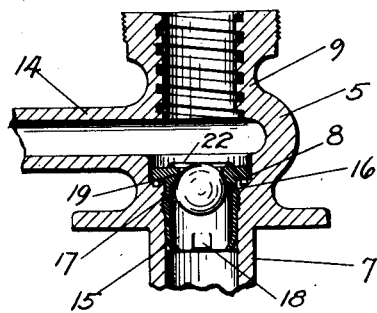
Figure 4:
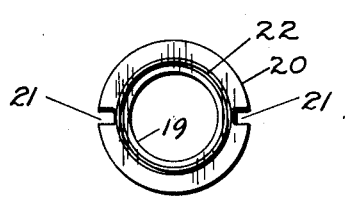
Figure 5:
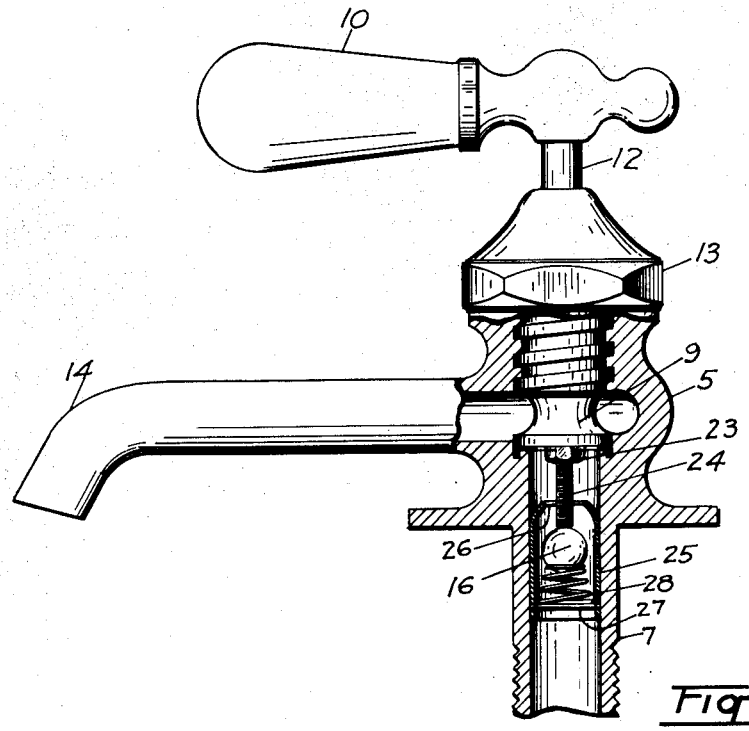
Figure 6:
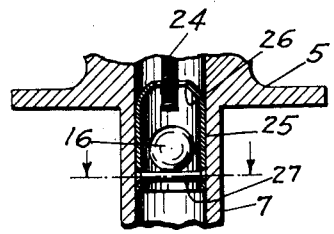
Figure 7:
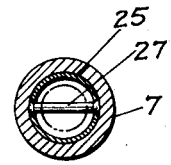

An embodiment of the invention has been illustrated in the accompanying drawings, in the several views of which like parts are correspondingly designated and in which, Figure 1 represents a sectional elevation of a faucet showing the elements comprised in the present invention in operative position, Figure 2, an enlarged fragmentary sectional view of the faucet parts to which the invention is applied, showing the devices included in the invention in vertical section, Figure 3, a sectional view of the faucet parts similar to that of Figure 2, showing the automatic shut-off valve of the attachment in the position to which it is moved by water-pressure after the faucet valve has been removed, Figure 4, a top-view of the element which houses the cut-off valve and provides a seat for the valve of the faucet, Figure 5, a sectional view, similar to Figure 1, showing a modified construction of the attachment, Figure 6, a fragmentary section of the inlet conduit of the faucet showing a modification of the form illustrated in Figure 5, and Figure 7, a section taken on the line 7—7, Figure 6.

Referring more specifically to the drawings, the reference character 5 designates the housing of a faucet of standard construction, provided as usual with a valve-seat 6 at the end of the inlet-pipe 7 which in practise is by means of a coupling connected to a service pipe of the water supply system.

The valve seat 6 is normally engaged by the elastic washer 8 of a screw valve 9 which cooperates with a female screw thread in the body portion of the housing for its adjustment in vertical direction by means of a handle 10 fastened at the protruding end of its stem 12.

A nut 13 screwed upon the housing is suitably packed to prevent leakage around the valve-stem, and a spout 14 projecting laterally from the body portion of the housing provides an outlet for the water when the valve 9 is moved off its seat by rotation of the handle 10.

The construction so far described is that of an ordinary faucet of the type commonly used on wash basins, and it is shown only as an illustrative embodiment of the class of devices on which my invention can be used.

Other faucets of different form may be equipped with the elements comprised in the invention, with equal facility, but since the construction and manner of installation of the parts remains substantially the same or at the most is immaterially changed, no further illustration is deemed necessary to convey a complete understanding of the nature and merits of the invention as will now be described.

The principal element of the invention comprises a flanged bushing 15 providing a cage for a ball valve 16. The bushing has an external screw thread 17 for its attachment to the faucet housing and it is incised at its lower edge to provide inwardly turned prongs 18 upon which the ball valve rests in its inoperative position.

The flange at the upper end of the bushing has an inwardly projecting part 19 which constitutes a seat for the ball valve when it is moved upwardly by water pressure to shut off the flow of water to the outlet of the housing, and it has an outwardly projecting portion 20 which determines the extent to which the bushing is screwed into the inlet of the faucet as will hereinafter be more fully explained.

The outer flange portion has opposite notches 21 for the application of a tool designed to turn the bushing to and from its operative position in the housing and the upper surface of the flange has an annular concentric ridge 22 of substantially V-shaped section which in practise provides a seat for the valve of the faucet.

In order to install the bushing in the faucet, the upper end of its inlet conduit immediately below the valve seat 6, is tapped by means of a tool inserted at the upper end of the housing after the screw valve has been removed, and the bushing 15 is screwed into the tapped part of the inlet until its flange 20 engages the valve seat 6. The latter is thus replaced by the seat 22 at the upper surface of the flange, which thereafter functions to cooperate with the valve 9 of the faucet in controlling the flow of water to the outlet 14 of the same.

Under normal conditions, the ball valve 16 in the cage provided by the bushing 15 is held away from the seat formed by the inwardly projecting portion 19 of the flange by the engagement of a downwardly projecting member of the faucet valve. In some faucets this member may be present in the form of a stud which supports the nut 23 by which the elastic washer 8 of the faucet valve is held in place. It frequently occurs, however, that this stud is too short to perform the desired function, in which case it is removed and replaced by a longer stud 24 as illustrated in Figure 2.

In applying this special stud it is desirable to tap the body part of the faucet valve to a depth sufficient for the adjustment of the stud to any desired length below the contact surface of the valve, while the nut screwed upon the stud as before locks it in its adjusted position.

In the operation of a faucet to which the invention is applied, the projecting member of the faucet valve engaging with the cut-off valve 16 prevents the latter from being lifted by the pressure of the water and the faucet can perform its function in the ordinary manner as before the attachment was inserted, the ridge 22 on the flange of the bushing providing an efficient seat for the valve of the faucet as a substitute for the original seat which is covered by the flange.

When for the purpose of repair the faucet valve is removed, the released ball valve is immediately lifted by the pressure of the water in the inlet pipe to engage with its seat at the upper end of the bushing, whereby the water flow to the outlet of the faucet is shut off until the valve 9 is restored to its original position.

In the modified construction illustrated in Figures 5, 6 and 7, the cage 25 of the shut-off valve 16 is exteriorly smooth and cylindrical to be driven into the inlet pipe 7 of the faucet by hydraulic force or other suitable means. The cage may thus be positioned at any desired distance from the valve-seat 6 of the faucet and is held in place by frictional contact with the wall of the inlet pipe 7. The cage is contracted at its upper end to provide a seat 26 for the valve 16 when the latter is lifted by the pressure of the water in the service pipe, and it is provided at its opposite end with a transverse pin 27. A spiral spring 28 supported on the pin engages the valve to aid its upward movement when released by the stud 24 on the faucet valve 9.

The construction illustrated in Figure 6 differs from the other only in the omission of the spring.

Having thus described my invention, what I claim and desire to secure by Letters Patent is:

1. The combination with a faucet having a main valve seat between an ingress opening and an egress opening and a valve cooperating with the seat to control the water flow between the openings, of a valve cage secured in the ingress opening and covering the main valve seat, a cut-off valve in the cage, and a projection on the faucet valve restricting the movement of the cut-off valve, the cage having interiorly a seat for the cut-off valve and exteriorly a seat for the faucet valve.

2. The combination with a faucet having a main valve seat between an ingress opening and an egress opening and a valve coperating with the seat to control the water-flow between the openings of a valve-cage fitted in the ingress opening and having a valve-seat and a valve-rest at opposite ends, a cut-off valve in the cage, and a projection on the faucet valve restricting the movement of the cut-off valve.

3. The combination with an internally screw-threaded faucet having a main valve seat between an ingress opening and an egress opening and a valve cooperating with the seat to control the water flow between the openings, of an externally screw-threaded valve cage cooperating with the screw threads of the faucet and covering the valve seat, a cut-off valve in the cage, and a projection on the faucet valve restricting the movement of the cut-off valve, the cage having interiorly a seat for the cut-off valve and exteriorly a seat for the faucet valve.

4. In a cut-off attachment for faucets, the combination of a valve cage detachable from the faucet, and having exteriorly a valve seat for engagement by a faucet valve and having interiorly a valve seat and a valve rest, and a cut-off valve loose in the cage adapted to engage either the last-mentioned seat or the rest, said cut-off valve being rotatable in the cage to constantly present a fresh surface to the valve seat.

5. In a cut-off attachment for faucets, the combination of a valve cage detachable from the faucet, and having exteriorly a valve seat for engagement by a faucet valve and having interiorly a valve seat and a valve rest, and a ball valve freely movable in the cage and adapted to engage either the last-mentioned seat or the rest.

6. The combination with a faucet having a main valve seat between an ingress conduit and an egress opening, and having a valve cooperating with the seat to control the flow of water between the conduit and the opening, of a cage in the ingress conduit, covering the main valve seat, the cage having exteriorly a valve seat for the faucet valve and having interiorly a valve seat and a valve rest, a cut-off valve in the cage, adapted to engage either the interior seat or the rest, and a projection on the faucet valve restricting the cut-off valve.

7. A self-contained cut-off attachment adapted to fit in the ingress conduit of a faucet from above the normal valve seat thereof, comprising a cage having a valve seat, and a valve cooperating with the seat, the cage having exteriorly a seat for the valve of the faucet.

8. A self-contained cut-off attachment adapted to fit in the ingress conduit of a faucet from above the normal valve seat thereof, comprising a cage having a valve seat and a valve rest, and a valve movable in the cage to engage either the seat or the rest, the cage having exteriorly a seat for the valve of the faucet.

In testimony whereof, I have affixed my signature.

WILLIAM L. THAETE.